(12) United States Patent
Osakabe et al.

(10) Patent No.: US 10,732,134 B2
(45) Date of Patent: Aug. 4, 2020

(54) X-RAY DIFFRACTION APPARATUS

(71) Applicant: RIGAKU CORPORATION, Tokyo (JP)

(72) Inventors: Takeshi Osakabe, Tokyo (JP); Toru Mitsunaga, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 16/357,613

(22) Filed: Mar. 19, 2019

(65) Prior Publication Data

US 2019/0293575 A1    Sep. 26, 2019

(30) Foreign Application Priority Data

Mar. 20, 2018 (JP) .................. 2018-052056

(51) Int. Cl.
  *G01N 23/207* (2018.01)
  *G01N 23/20016* (2018.01)
  *G21K 1/06* (2006.01)
  *G01N 23/20008* (2018.01)

(52) U.S. Cl.
  CPC ..... *G01N 23/207* (2013.01); *G01N 23/20008* (2013.01); *G01N 23/20016* (2013.01); *G21K 1/062* (2013.01); *G01N 2223/316* (2013.01); *G01N 2223/3305* (2013.01)

(58) Field of Classification Search
  None
  See application file for complete search history.

(56) References Cited

U.S. PATENT DOCUMENTS

| | | | | |
|---|---|---|---|---|
| 5,802,137 A | * | 9/1998 | Wilkins | ........... A61B 6/484 250/363.1 |
| 6,574,306 B2 | * | 6/2003 | Kikuchi | ........... G21K 1/06 378/145 |
| 6,665,372 B2 | | 12/2003 | Bahr et al. | |
| 6,807,251 B2 | | 10/2004 | Okanda et al. | |
| 6,917,667 B2 | * | 7/2005 | Fujinawa | ........... G21K 1/06 378/70 |
| 6,990,177 B2 | | 1/2006 | Fujinawa et al. | |
| 7,542,548 B2 | * | 6/2009 | Matsuo | ........... G21K 1/025 378/44 |

(Continued)

FOREIGN PATENT DOCUMENTS

| | | |
|---|---|---|
| JP | 3548556 B2 | 7/2004 |
| JP | 3757199 B2 | 3/2006 |
| JP | 2017-151082 A | 8/2017 |

*Primary Examiner* — Thomas R Artman
(74) *Attorney, Agent, or Firm* — Birch, Stewart, Kolasch & Birch, LLP.

(57) ABSTRACT

An X-ray diffraction apparatus includes: an X-ray source (110); a first incident path letting the generated X-ray beam pass therethrough; a second incident path letting the generated X-ray beam be reflected by a multilayer film mirror and letting the reflected X-ray beam pass therethrough in parallel with the X-ray beam having passed through the first incident path. A movement mechanism is provided moving the X-ray source (110) between the first incident path and the second incident path while preserving respective relative positions thereof. An incident slit (160) allows an X-ray beam to be incident on a sample S pass therethrough; and a sample support stage (165) supports the sample S at a position fixed relative to the incident slit (160).

5 Claims, 10 Drawing Sheets (56) References Cited

U.S. PATENT DOCUMENTS

| | | | | |
|---|---|---|---|---|
| 8,126,117 B2* | 2/2012 | Verman | ................. | B82Y 10/00 378/135 |
| 8,249,220 B2* | 8/2012 | Verman | ................. | B82Y 10/00 378/147 |
| 9,014,335 B2* | 4/2015 | Jiang | .................... | G01N 23/201 378/87 |
| 9,269,468 B2* | 2/2016 | Ryan | ....................... | G01N 23/20 |
| 2003/0043965 A1 | 3/2003 | Bahr et al. | | |
| 2003/0123610 A1 | 7/2003 | Okanda et al. | | |
| 2004/0066896 A1* | 4/2004 | Fujinawa | ................. | G21K 1/06 378/92 |
| 2004/0066903 A1 | 4/2004 | Fujinawa et al. | | |
| 2008/0084967 A1* | 4/2008 | Matsuo | ................... | G21K 1/06 378/149 |
| 2017/0176356 A1 | 6/2017 | Hoffman et al. | | |

* cited by examiner

X-RAY DIFFRACTION APPARATUS

CROSS-REFERENCE TO RELATED APPLICATION

This application claims the benefit of priority under 35 U.S.C. § 119 to Japanese Patent Application No. 2018-052056, filed Mar. 20, 2018, the contents of which are incorporated herein by reference in their entirety.

FIELD OF THE INVENTION

The present invention relates to the an X-ray diffraction apparatus capable of switching x-ray beams to be irradiated on a sample.

DESCRIPTION OF THE RELATED ART

Incident optical systems of X-ray diffraction apparatuses include optical systems that uses a mirror and optical systems that does not use a mirror, for which applications are known that take advantage of their respective superior features. In recent years, there are increasing needs for successive measurement by quickly switching optical systems in such as in-situ measurement, for which the so-called CBO (cross-beam optics) has been developed (see Patent Document Japanese Patent No. 3548556 B2, for example). CBO is a beam switching mechanism which has two optical paths, namely, a window for taking in X-rays to use a mirror and a window for guiding X-rays to the sample without using a mirror, and uses a selection slit that blocks one optical path and opens the other.

Figure 5A:
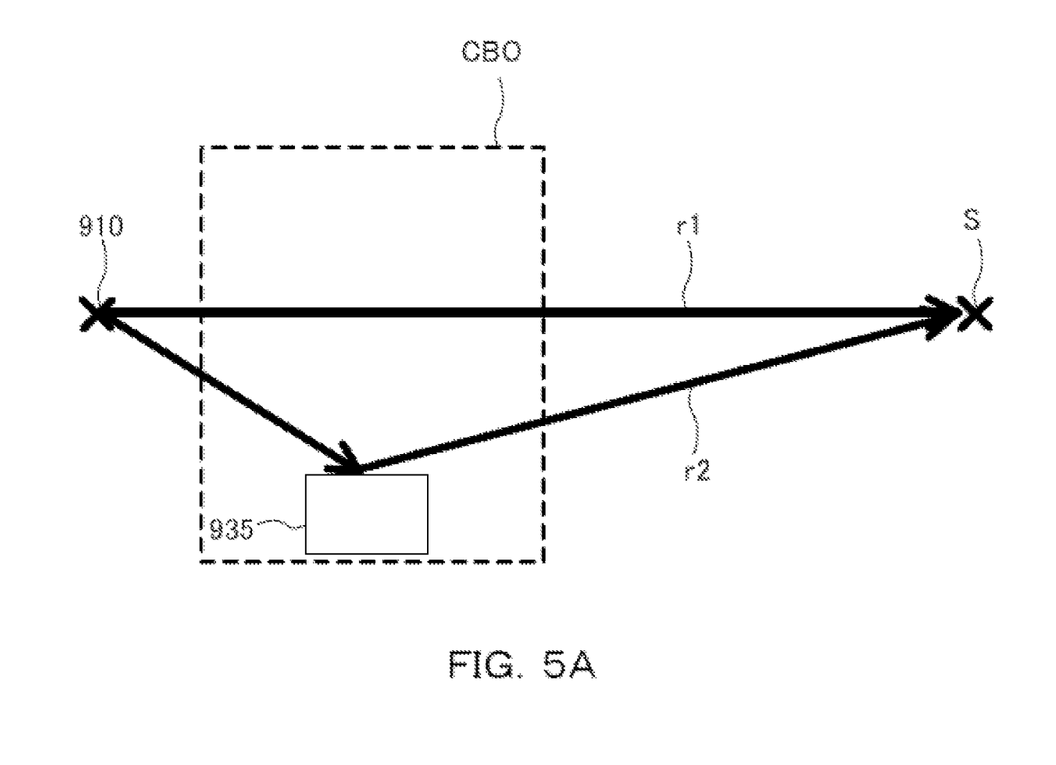
FIGS. 5A to 5C are schematic views respectively illustrating CBO-based conventional incident optical systems.
Figure 5B:
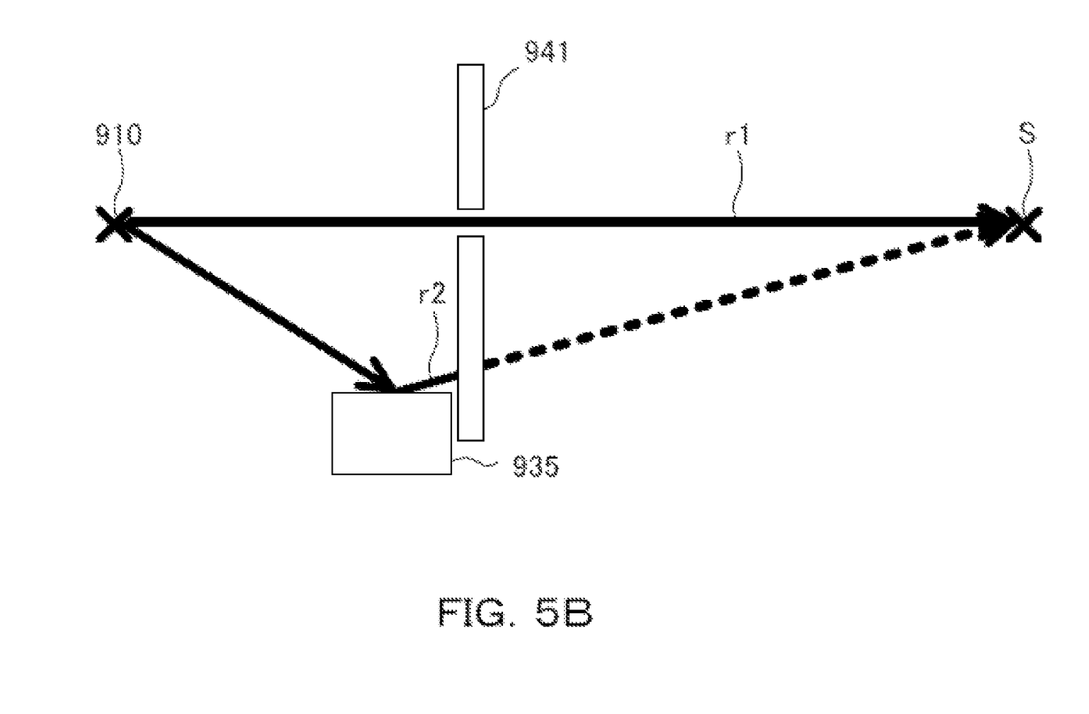
Figure 5C:
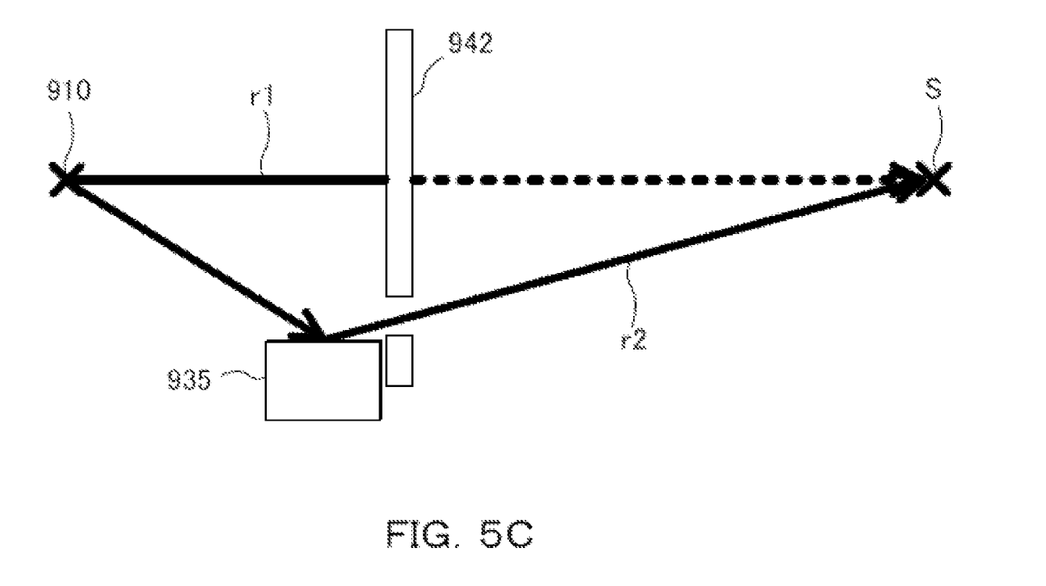

FIGS. 5A to 5C are schematic views illustrating conventional incident optical systems respectively realized by CBO. As illustrated in FIG. 5A, using CBO allows for switching between an X-ray beam r1 which does not use a mirror 935 and an X-ray beam r2 which uses a mirror 935 to be irradiated on a sample S. Specifically, changing two types of selection slits 941 and 942 allows for blocking one of the X-ray beams and letting the other pass through, as illustrated in FIGS. 5B and 5C. Here, in FIGS. 5B and 5C, the mechanism is simplified with the selection slits 941 and 942 being emphasized.

Figure 6:
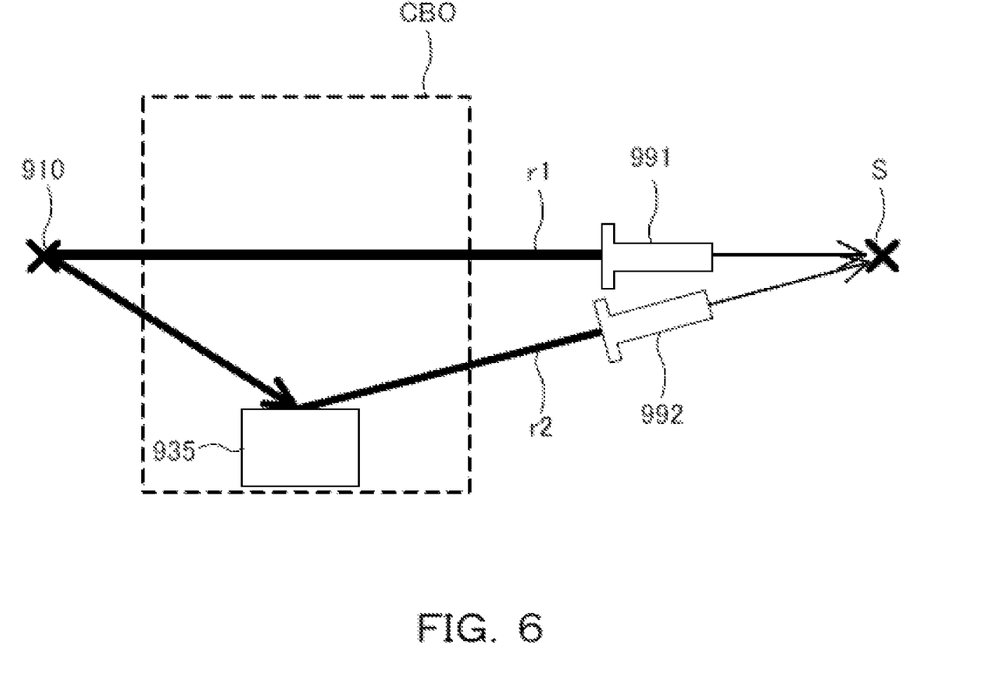
FIG. 6 is a schematic view illustrating a CBO-based conventional incident optical system when using a collimator.

FIG. 6 is a schematic view illustrating a conventional incident optical system realized by CBO in the case of using a collimator. In the case of using a collimator in an incident optical system realized by CBO, respective positions and orientations of a collimator 991 for the X-ray beam r1 and a collimator 992 for the X-ray beam r2 are different. Therefore, two collimator holders are required to support the collimator 991 and 992, respectively.

Besides the devices using CBO as described above, there is known a device that selects an incident optical system using the rotational movement of an optical unit, a device that switches three X-ray optical paths using rotation of a slit device having a plurality of apertures, and a device that switches three X-ray optical paths by moving a carriage of an X-ray optical assembly (see Patent Documents US Patent Publication No. 2003/0043965 A1, Japanese Patent No. 3757199 B2, and Japanese Patent Laid-Open No. 2017-151082 A, for example).

In the switching technique of X-ray beams such as CBO described above, it is assumed the user switches slits by manual work. Even when automatically switching slits, a motorized axle is necessary for changing the position and the width of a selected slit, which requires a complicated configuration. Therefore, there is a need for allowing switching between X-ray beams through two incident paths in an X-ray diffraction apparatus with a simple configuration relieving the user of burden.

SUMMARY OF THE INVENTION

It is an object of the present invention, which has been made in view of the aforementioned circumstances, to provide an X-ray diffraction apparatus that allows for switching between an optical system that uses a mirror and an optical system that does not use a mirror, with a simple configuration as well as a manner relieving the user of burden.

To achieve the aforementioned object, an X-ray diffraction apparatus of the present invention includes: an X-ray source configured to generate an X-ray beam; a first incident path configured to let the generated X-ray beam pass therethrough with a predetermined divergence angle; a second incident path configured to let the generated X-ray beam be reflected by a multilayer film mirror and let the reflected X-ray beam pass therethrough in parallel with the X-ray beam having passed through the first incident path; a movement mechanism configured to move the X-ray source, the first incident path, and the second incident path in a predetermined direction while preserving respective relative positions thereof; an incident slit configured to let an X-ray beam to be incident on a sample pass therethrough; and a sample support stage configured to support a sample at a position fixed relative to the incident slit, the apparatus being characterized in that the movement mechanism switches an X-ray beam to be passed through the incident slit between the X-ray beams having passed through the first incident path or the second incident path.

As thus described, it turns out that one of the parallel X-ray beams having passed through respective paths is irradiated on the sample by moving the X-ray source, the first incident path, and the second incident path in a predetermined direction. As a result, it has become possible to switch an optical system that uses a mirror and an optical system that does not use a mirror, with a simple configuration as well as a manner relieving the user of burden.

In addition, the X-ray diffraction apparatus of the present invention is characterized in that the first incident path is formed of a first aperture configured to narrow the generated X-ray beams to a predetermined divergence angle, and a first selection slit configured to select an X-ray beam having passed through the first aperture, and the second incident path is formed of a second aperture configured to narrow the generated X-ray beams toward the multilayer film mirror, the multilayer film mirror and a second selection slit configured to select an X-ray beam having been reflected by the multilayer film mirror.

As thus described, it is possible to form the first incident path and the second incident path with the aperture, the multilayer film mirror, and the selection slit. In addition, since the aperture and the selection slit are the only hardware modification required for a beam switching device (CBO) in which respective beams are crossed at the sample position, it is possible to make a change to the CBO at a low cost.

In addition, the X-ray diffraction apparatus of the present invention is characterized in that the multilayer film mirror is configured to shape the generated X-ray beams into parallel beams, focused beams, or diverging beams. Accordingly, it is possible to use parallel beams, focused beams, and diverging beams as X-ray beams having passed through the second incident path.

In addition, the X-ray diffraction apparatus of the present invention is characterized in further including a collimator holder configured to hold a collimator that narrows the X-ray beams having passed through the incident slit at a fixed orientation relative to the incident slit. Accordingly, a single collimator holder can be used in common for two X-ray beams to be switched.

In addition, the X-ray diffraction apparatus of the present invention is characterized in that the movement mechanism has a motorized axle configured to move the X-ray source, the first incident path, and the second incident path, upon receiving an instruction to switch the X-ray beams to be passed through the incident slit.

As thus described, it is possible to switch X-ray beams upon receiving an instruction, which allows for automatically switching incident optical systems by only controlling the motorized axle without the user having to manually change slits. It is possible to automatically switch beams without newly adding a motorized axle to a beam switching device in which respective beams are crossed at the sample position. In addition, automatic switching becomes possible, allowing for continuous measurement in a manner automatically switching between two incident optical systems.

According to the current invention, it becomes possible to switch an optical system that uses a mirror and an optical system that does not use a mirror, with a simple configuration as well as a manner relieving the user of burden.

DETAILED DESCRIPTION OF THE INVENTION

Next, embodiments of the present invention is described below, referring to the accompanying drawings. For ease of understanding the description, same reference numerals are provided to same components in each drawing, with duplicate explanation being omitted.

Figure 1:
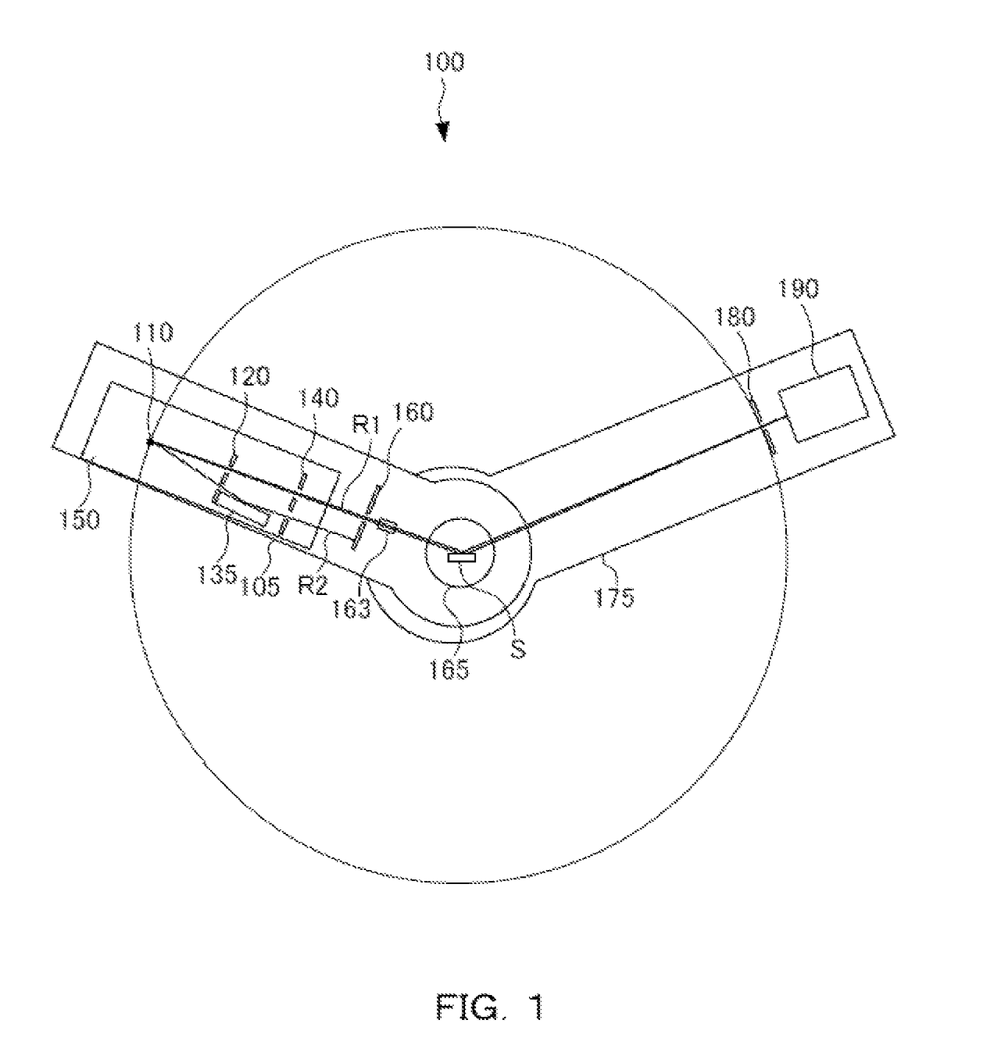
FIG. 1 is a plan view illustrating a configuration of an X-ray diffraction apparatus of the present invention.

The configuration of an x-ray diffraction apparatus in accordance with an embodiment of the invention is described as follows:

FIG. 1 is a plan view illustrating a configuration of an X-ray diffraction apparatus 100. As illustrated in FIG. 1, the X-ray diffraction apparatus 100 has an X-ray source 110, an aperture 120, a multilayer film mirror 135, a selection slit 140, an incident slit 160, a collimator holder 163, a sample support stage 165, a light-receiving slit 180, and an X-ray detector 190. In the example of FIG. 1, an X-ray beam R1 having passed through the first incident path is being irradiated on a sample S. Details of the incident path are described below.

The X-ray source 110 generates an X-ray beam. The X-ray source 110 is formed as an X-ray focus in an electron beam irradiation region on a target in an X-ray tube and extends in an elongated manner in a direction perpendicular to the X-ray emission direction. The aperture 120, the multilayer film mirror 135, the selection slit 140, and the incident slit 160 are provided between the X-ray source 110 and the sample S, in the order starting from the side of the X-ray source 110.

The aperture 120, which is formed of an aperture slit board, prevents unnecessary X-rays from entering the incident path, thereby reducing the influence of scattered X-rays. The aperture 120 has a first opening 120a (first aperture) and a second opening 120b (second aperture) formed therein, and the X-ray beam having passed through the first opening 120a proceeds with a predetermined divergence angle. On the other hand, the X-ray beam having passed through the second opening 120b turns out to be a beam reflected and shaped by a reflecting surface of the multilayer film mirror 135. It is preferred that the aperture 120 is fixed with a screw on an edge surface of the multilayer film mirror 135 so that both are integrated together. Note that, the aperture 120 is located at a position close to the X-ray source 110 and therefore it does not happen that a part of the X-ray beams defined by the incident slit 160 are blocked by the aperture 120.

The multilayer film mirror 135 shapes the X-ray beams having passed through the second opening 120b of the aperture 120 into parallel beams (PB), focused beams (CB), or diverging beams (DB), in accordance with their type. The type of beams to be formed differs depending on the type of the multilayer film mirror 135 provided. The center of the multilayer film mirror 135 in the longitudinal direction lies on a circle centered at the X-ray source 110 with a predetermined radius.

The selection slit 140 has a first opening 140a (first selection slit) and a second opening 140b (second selection slit), each opening being provided at a position where the direction of an X-ray beam R1 having passed through the first incident path and the direction of an X-ray beam R2 having passed through the second incident path are parallel.

For example, the reflecting surface of the multilayer film mirror 135 configured to generate parallel beams has a paraboloidal shape, the multilayer film mirror 135 being provided so that the X-ray focus lies on the focal position of the paraboloid. Therefore, X-ray beams reflected by the paraboloid are parallel beams. The reflecting surface is formed of an artificial multilayer film having heavy elements and light elements alternately stacked thereon, the deposition period thereof continuously varying along the parabolic surface. Accordingly, X-rays with a particular wavelength (CuKα ray, in the example) satisfy Bragg's diffraction condition at any position on the reflecting surface. The multilayer film mirror 135 of this case selectively reflects only X-rays with a particular wavelength, turns them into parallel beams and is therefore a monochrometer.

For example, to allow for switching between the focusing method and the parallel-beam method, it is necessary to position the multilayer film mirror 135 so that the X-ray beam R2 according to the parallel-beam method reflected by the multilayer film mirror 135 is emitted in a direction parallel to the X-ray beam R1 according to the focusing method. The multilayer film mirror 135 is designed for CuKα rays, with the focus of the paraboloid being located at a predetermined distance from the center of the multilayer film mirror 135 in the longitudinal direction (center of the multilayer film mirror 135). Therefore, it suffices to provide the paraboloidal mirror so that the center of the multilayer film mirror 135 lies at a predetermined distance from the X-ray focus for the switching.

The incident slit 160, having an opening 160a, lets X-ray beams incident on the sample S pass therethrough. The collimator holder 163 holds a collimator that narrows the X-ray beams having passed through the incident slit 160 at a fixed orientation relative to the incident slit 160. Accordingly, a single collimator holder 163 can be used in common for two X-ray beams to be switched.

An incident optical system support stage 105 has the X-ray source 110, the aperture 120, the multilayer film mirror 135, the selection slit 140, and the incident slit 160 mounted thereon. Among the aforementioned components, the X-ray source 110, the aperture 120, the multilayer film mirror 135, and the selection slit 140 form a mobile unit 150, and a movement mechanism allows for movement while preserving the relative positions of respective components for each mobile unit 150. Switching between the focusing method and the parallel-beam method does not change the relative position relation of respective components of the mobile unit 150, and also does not change the relative position relation between the incident slit 160 and the center of the sample S.

The movement mechanism has a motorized axle that moves the X-ray source 110, the first incident path, and the second incident path, upon receiving an instruction to switch the X-ray beams to be passed through the incident slit 160. The movement mechanism then moves the X-ray source 110, the first incident path, and the second incident path in a predetermined direction while preserving respective relative positions thereof.

Since it is possible to switch X-ray beams upon receiving an instruction as described above, automatic switching of incident optical systems and continuous measurement can be performed by only controlling the motorized axle without the user having to manually switch slits. Automatic switching of beams is possible without newly adding a motorized axle to a beam switching device in which respective beams are crossed at the sample position. In addition, since automatic switching is allowed, it is also possible to perform continuous measurement in a manner automatically switching between two incident optical systems. Additionally, the channel-cut crystal, which is installable at a preceding stage of the incident slit 160, can also be utilized as it is.

The incident optical system support stage 105 is rotatable about a center of rotation of a goniometer, and a detector support stage 175 is also rotatable about the center of rotation of the goniometer. When measuring in the basis of the focusing method, it is possible to measure the diffraction pattern by rotating the incident optical system support stage 105 and the detector support stage 175 in opposite directions to each other at a same angular velocity, while keeping the sample S still.

The light-receiving slit 180 and the X-ray source 110 are provided on a concentration circle with the radius of rotation of the goniometer being its radius. The sample support stage 165, supporting the sample S mounted thereon at a position fixed relative to the incident slit 160, is rotatable about the center of rotation of the goniometer. Although the samples S are switched as appropriate basically in accordance with switching of X-ray beams, the same samples S can be measured across switched X-rays. The light receiving slit 180 and the X-ray detector 190 are mounted on the detector support stage 175, the detector support stage 175 also being rotatable about the center of rotation of the goniometer.

The X-ray diffraction apparatus 100 uses the movement mechanism to switch opening and blocking of the incident path of the focusing method and the incident path of the parallel-beam method, and therefore switching of selection slits is not required associated with switching of paths, whereby it is possible to automatically switch between the focusing method and the parallel beam method. In addition, a paraboloidal multilayer film mirror can be used in the parallel-beam method, in which case parallel beams with a high resolution and a high intensity is obtained.

As long as the center of the multilayer film mirror 135 is located on a circle (circle centered at the X-ray source with the predetermined radius), parallel beams are provided by the multilayer film mirror 135 wherever the multilayer film mirror 135 is located.

Figure 2A:
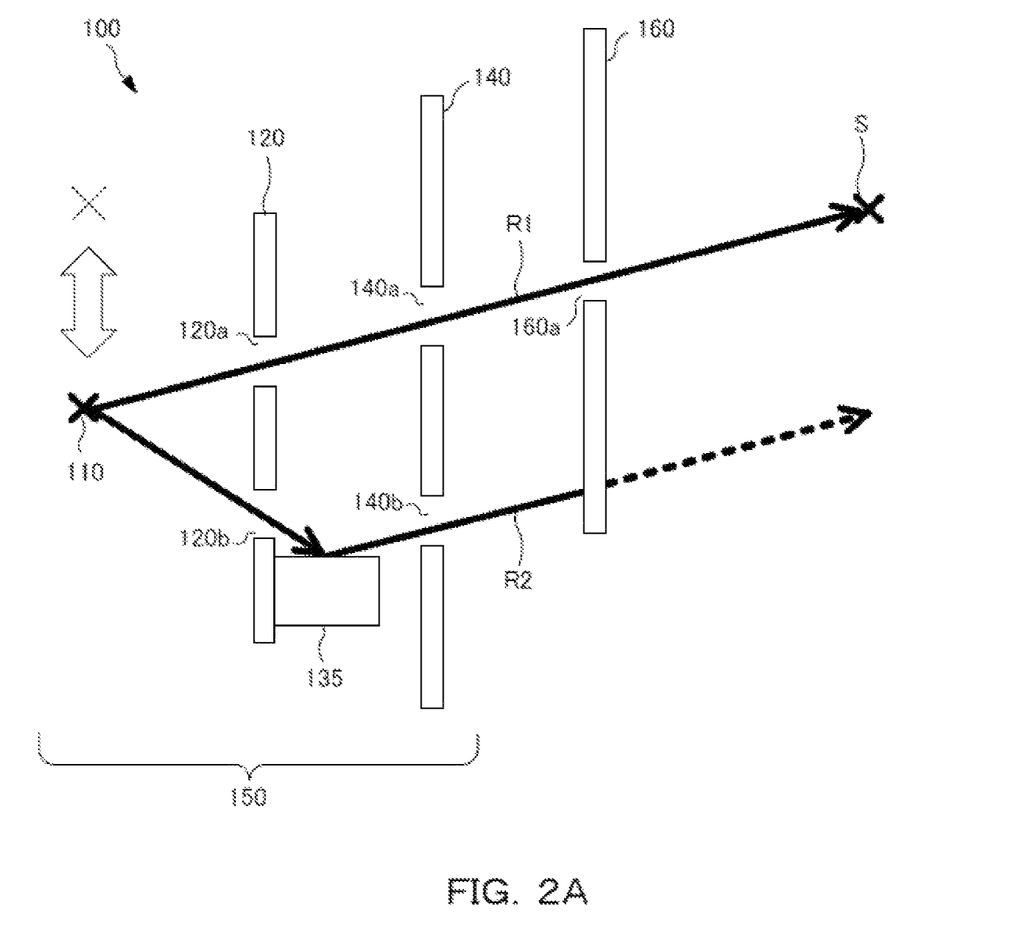
FIGS. 2A and 2B are schematic views illustrating incident optical systems when irradiating an X-ray beam on a sample through a first and a second incident paths, respectively.
Figure 2B:
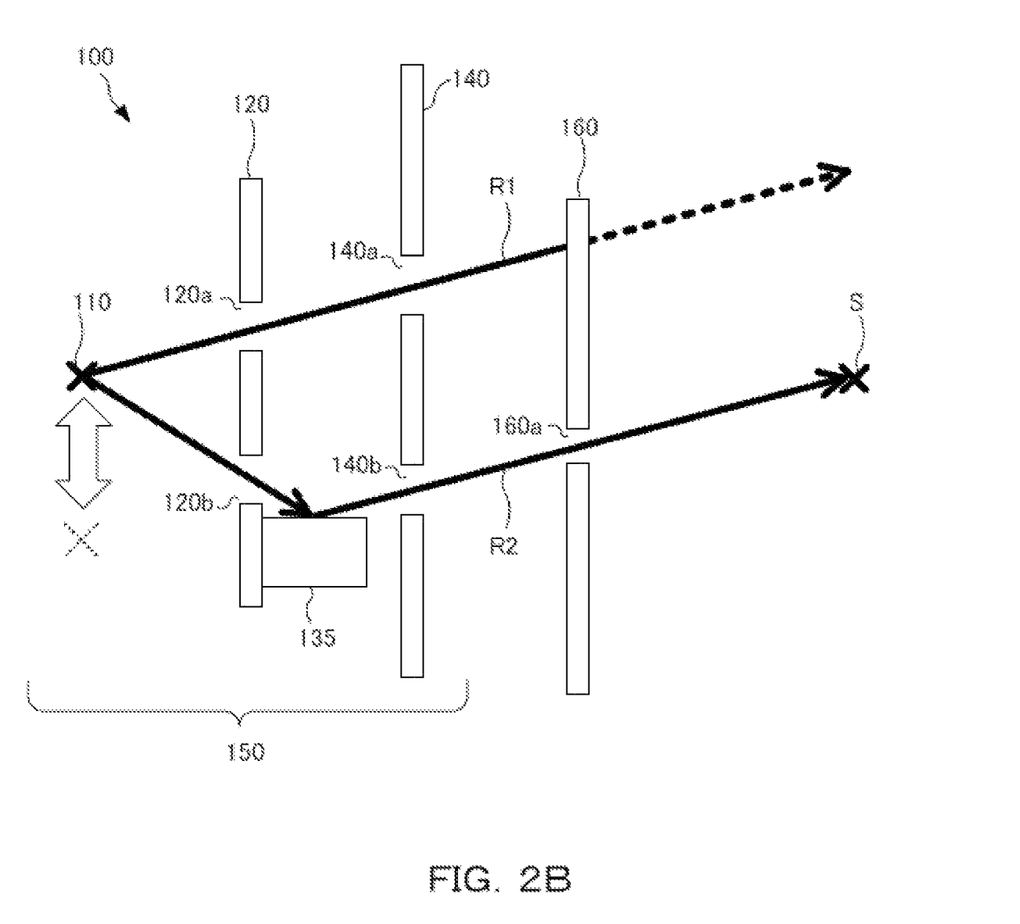

FIGS. 2A and 2B are schematic views illustrating incident optical systems when irradiating an X-ray beam on the sample S through a first and a second incident paths, respectively.

The first incident path (path according to the focusing method) lets the generated X-ray beam pass therethrough with a predetermined divergence angle. The first incident path is formed of the first opening 120a of the aperture 120 which narrows the generated X-ray beams to a predetermined divergence angle, and the first opening 140a of the selection slit 140 that selects an X-ray beam having passed through the first opening 120a.

The second incident path (for example, a path according to the parallel-beam method) lets the generated X-ray beam be reflected by the multilayer film mirror 135, and lets the reflected X-ray beam pass therethrough in parallel with the X-ray beam R1 having passed through the first incident path. The second incident path is formed of the second opening 120b of the aperture 120 that narrows the generated X-ray beams toward the multilayer film mirror 135, the multilayer film mirror 135, and the second opening 140b of the selection slit 140 that selects an X-ray beam reflected by the multilayer film mirror 135.

As thus described, the first incident path and the second incident path can be formed of the aperture 120, the multilayer film mirror 135, and the selection slit 140. Additionally, in the case where a beam switching device (CBO) is used in which respective beams are crossed at the sample position, it suffices to modify, in terms of hardware, only the aperture 120 and the selection slit 140 on the basis of the beam switching device for the application of embodiment, the modification being realizable at a low cost.

The X-ray diffraction apparatus 100 causes the movement mechanism to select an X-ray beam to be passed through the incident slit 160 by switching between the X-ray beams R1 and R2 having passed through the first incident path or the second incident path. As thus described, it turns out that one of the parallel X-ray beams having passed through respective paths is irradiated on the sample S by moving the X-ray source 110, the first incident path, and the second incident path in a predetermined direction. As a result, it has become possible to switch an optical system that uses a mirror and an optical system that does not use a mirror, with a simple configuration as well as a manner relieving the user of burden.

Figure 4:
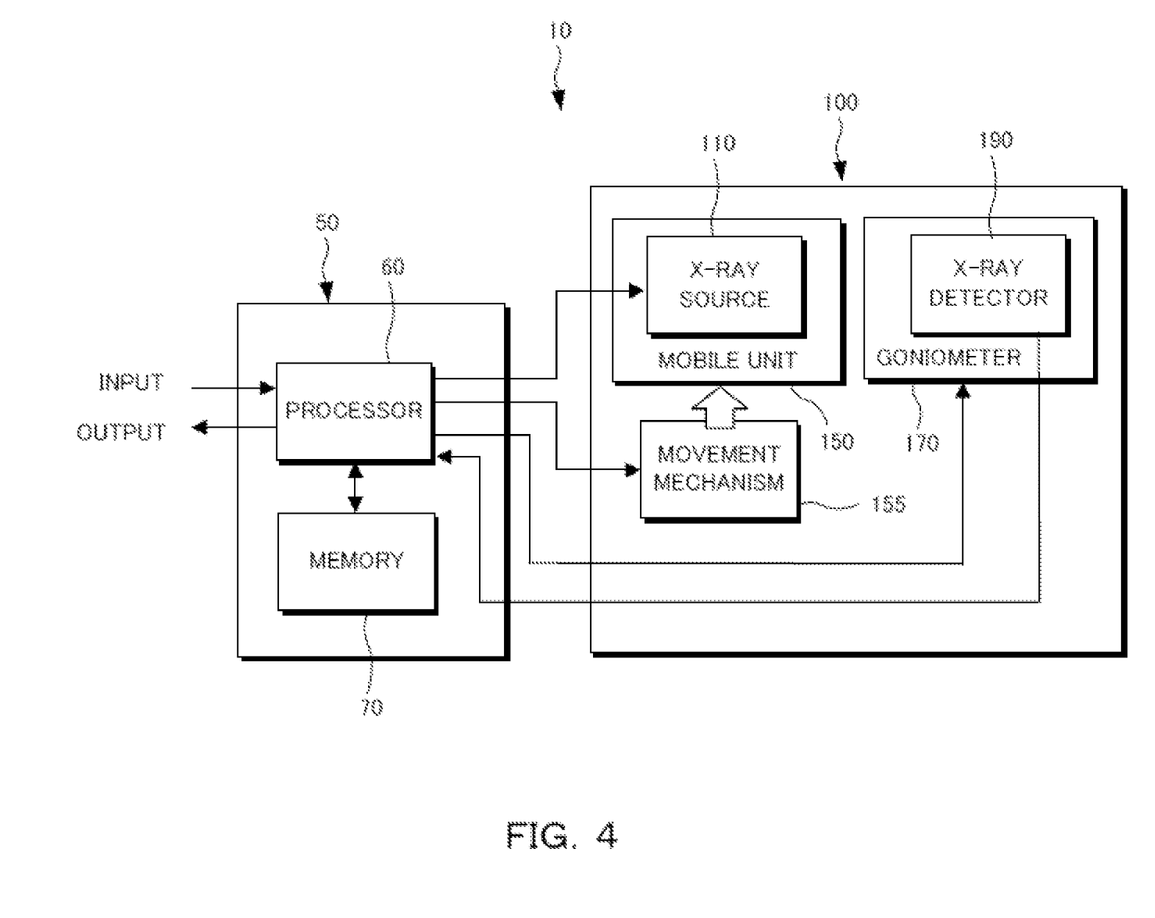
FIG. 4 is a block diagram illustrating an X-ray diffraction system.

The X-ray diffraction apparatus 100 is capable of operating and reading data with a processing unit such as a PC. FIG. 4 is a block diagram illustrating an X-ray diffraction system 10. The X-ray diffraction system 10 includes a processing unit 50 and the X-ray diffraction apparatus 100.

As illustrated in FIG. 4, processing unit 50 has a processor 60 and a memory 70, and is capable of receiving input from an operation unit such as a keyboard and outputting the read data and the processing result to a display or the like.

The processing unit 50 is connected to the X-ray diffraction apparatus 100 in a wired or wireless manner. The processing unit 50 is capable of controlling the X-ray source 110 to generate X-rays, driving the goniometer 170, and reading X-ray detection data from the X-ray detector 190. In addition, the processing unit 50 can, upon receiving the result of operation or some type of processing, provide instructions to the movement mechanism 155 so as to move the mobile unit 150, and automatically perform switching of X-ray beams.

Next, a method of using the X-ray diffraction apparatus 100 is described. As an example, there is described a case of switching between the focusing method and the parallel-beam method.

First, setting of the incident optical system is performed. The X-ray source 110 and the multilayer film mirror 135 are mounted on a common adjustment stage. The relative positional relation between the X-ray source 110 and the multilayer film mirror 135 is preliminarily positioned at a predetermined position by design. The aperture 120, the multilayer film mirror 135, and the selection slit 140 are set so that the X-ray beam according to the parallel-beam method and the X-ray beam according to the focused beam method are parallel to each other.

The multilayer film mirror 135 is designed so that the angle of the emitted X-ray relative to the incident X-ray turns out to be a particular angle δ. The angle δ is equal to twice the Bragg's angle θM when the X-ray is diffracted by the reflecting surface of the multilayer film mirror 135. The multilayer film mirror 135 is designed to use CuKα rays For letting parallel beams from the multilayer film mirror 135 be emitted in a direction parallel to an X-ray beam according to the focusing method, it suffices to set, for example, the angle between the direction of the X-ray beam defined by the first opening 120a of the aperture 120 and the first opening 140a of the selection slit 140, and the direction of the X-ray beam defined by the second opening 120b of the aperture 120 to be δ.

Next, X-ray diffraction measurement according to the focusing method is described. In the arrangement illustrated in FIG. 2A, an X-ray beam passing through the first opening 120a of the aperture 120, among the X-rays emitted from the X-ray source 110, is restricted to a predetermined divergence angle at the incident slit 160 and incident on the sample S after having passed through the first opening 140a of the selection slit 140.

In the example illustrated in FIG. 2A, the mobile unit 150 is provided at a position where only an X-ray beam for the focusing method passes through the aperture of the incident slit 160. Accordingly, it is possible to measure the X-ray diffraction of the sample S according to the focusing method. The X-ray beam is incident on the surface of the sample S after having been restricted to a predetermined divergence angle at the incident slit 160.

On the other hand, an X-ray beam having passed through the second opening 120b of the aperture 120 is reflected by the multilayer film mirror 135. However, parallel beams emitted therefrom are blocked by the incident slit 160 and do not reach the sample S.

Diffracted X-rays from the sample S pass through the light-receiving slit 180, and detected by the X-ray detector 190. On this occasion, an X-ray diffraction pattern is obtained by rotating the incident optical system support stage 105 and the detector support stage 175 cooperatively in opposite directions to each other at a same angular velocity.

To switch from the focusing method to the parallel-beam method, the mobile unit 150 is moved to a position where an X-ray beam having passed through the second incident path passes through the opening 160a of the incident slit 160. As illustrated in FIG. 2B, an X-ray beam for the parallel beam method passes through the second opening 120b of the aperture 120, is reflected by the multilayer film mirror 135, and turns out to be a parallel beam. Only the parallel beam passes through the opening 160a of the incident slit 160. On the other hand, an X-ray beam for the focusing method is blocked by the incident slit 160. For the incident slit 160, there is a preliminary setting such that the path from the opening 160a of the incident slit 160 to the sample S turns out to be parallel to X-ray beams R1 and R2 which have passed through the first or the second incident paths.

In the aforementioned case, switching from the focusing method to the parallel-beam method is completed. In other words, moving only the X-ray source 110, the aperture 120, and the selection slit 140 without moving the incident slit 160 and the central position of the sample S completes switching from the focusing method to the parallel beam method. It is not necessary to redo the setting of the optical system. When switching from the focusing method to the parallel-beam method, the mobile unit 150 can be automatically driven while preserving the relative position of respective components, with the incident slit 160 and the sample support stage 165 being fixed, whereby the initially-set setting state does not degrade. Note that the movement direction of switching from the parallel-beam method to the focusing method is opposite, with other conditions being similar.

When performing X-ray diffraction measurement according to the parallel-beam method, a very wide aperture width of the light-receiving slit 180 is preferred. In addition, it is preferred to bring the X-ray detector 190 closer to the sample S to raise the X-ray intensity to be detected. Therefore, it is preferred that the X-ray detector 190 is slidable in a longitudinal direction of the detector support stage 175.

Figure 3A:
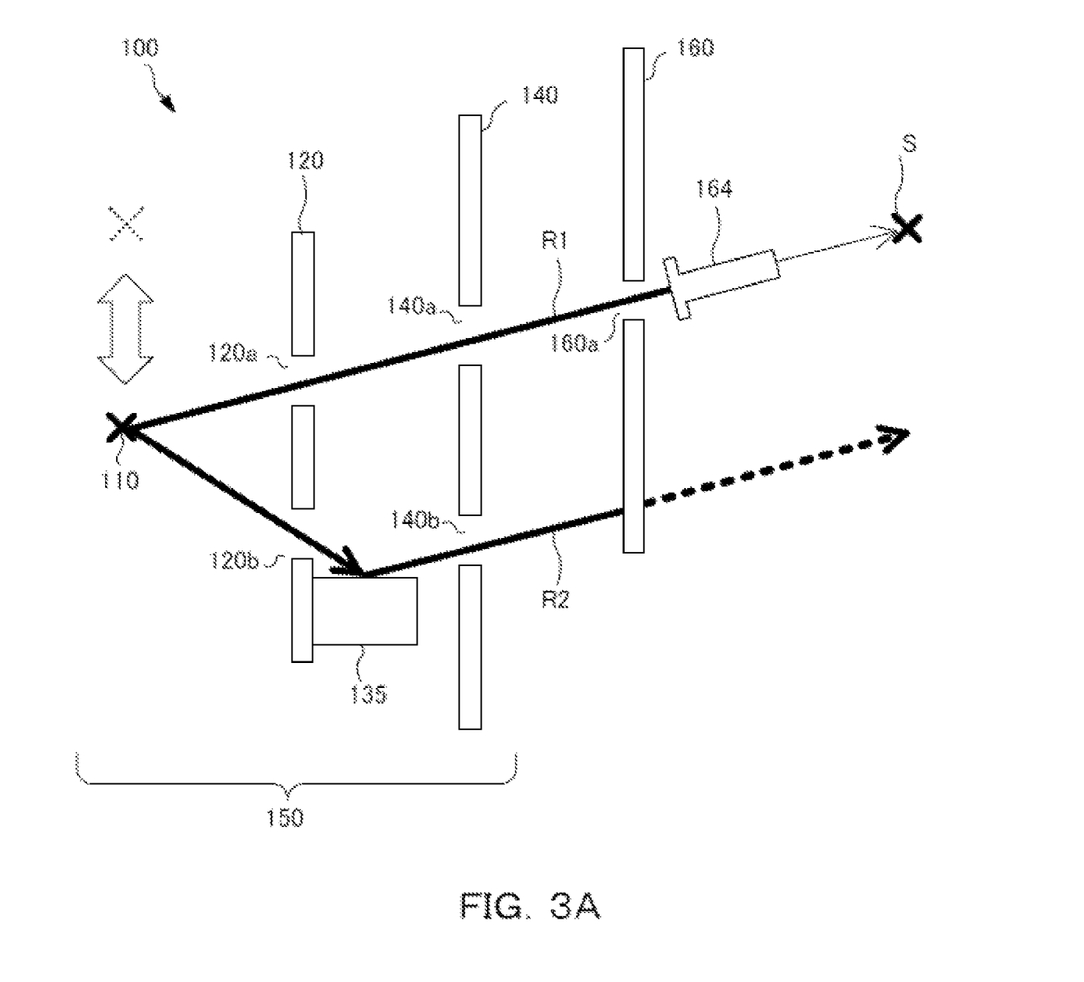
FIGS. 3A and 3B are schematic views illustrating incident optical systems when irradiating an X-ray beam on a sample through the first and the second incident paths, respectively, using a collimator.
Figure 3B:
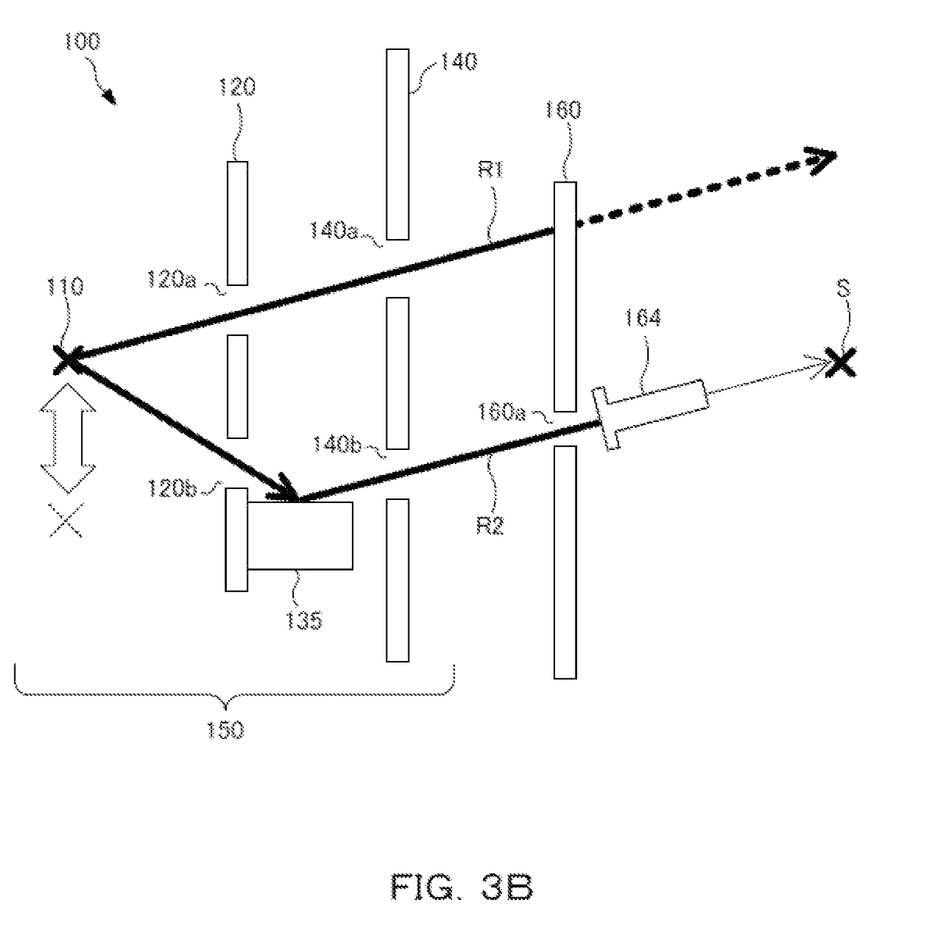

A case of using a collimator is described. FIGS. 3A and 3B are schematic views illustrating incident optical systems when irradiating X-ray beams on a sample via a first and a second incident paths using a collimator 164. As illustrated in FIGS. 3A and 3B, a collimator holder holds the collimator 164 at a fixed orientation relative to an incident slit, a single collimator holder being sufficient for switching X-ray beams. Note that a channel-cut monochrometer can be installed for use at a preceding stage of the incident slit 160.

While the above description constitutes the preferred embodiment of the present invention, it will be appreciated that the invention is susceptible to modification, variation and change without departing from the proper scope and fair meaning of the accompanying claims.

The invention claimed is:

1. An X-ray diffraction apparatus comprising:
   an X-ray source configured to generate an X-ray beam;
   a first incident path configured to let the X-ray beam pass therethrough with a predetermined divergence angle;
   a second incident path configured to let the X-ray beam be reflected by a multilayer film mirror and let the X-ray beam after reflection to pass therethrough in parallel with the X-ray beam having passed through the first incident path;
   a movement mechanism configured to move the X-ray source, the first incident path, and the second incident path in a predetermined direction while preserving respective relative positions thereof;

an incident slit configured to let the X-ray beam to be incident on a sample pass therethrough; and a sample support stage configured to support the sample at a position fixed relative to the incident slit, wherein the movement mechanism switches the X-ray beam to be passed through the incident slit between the X-ray beam having passed through the first incident path or alternatively the second incident path.

2. The X-ray diffraction apparatus according to claim 1 further comprising, the first incident path is formed of a first aperture configured to narrow the generated X-ray beam to a predetermined divergence angle, and a first selection slit configured to select the X-ray beam having passed through the first aperture, and the second incident path is formed of a second aperture configured to narrow the X-ray beam toward the multilayer film mirror, the multilayer film mirror and a second selection slit configured to select the X-ray beam having been reflected by the multilayer film mirror.

3. The X-ray diffraction apparatus according to claim 1 further comprising, the multilayer film mirror is configured to shape the generated X-ray beam into a parallel beam, a focused beam, or a diverging beam.

4. The X-ray diffraction apparatus according to claim 1 further comprising, a collimator holder configured to hold a collimator that narrows the X-ray beam having passed through the incident slit at a fixed orientation relative to the incident slit.

5. The X-ray diffraction apparatus according to claim 1 further comprising, the movement mechanism has a motorized axle configured to move the X-ray source, the first incident path, and the second incident path upon receiving an instruction to switch the X-ray beam to be passed through the incident slit.

\* \* \* \* \*